US011807386B2

(12) United States Patent
Misenheimer et al.

(10) Patent No.: US 11,807,386 B2
(45) Date of Patent: Nov. 7, 2023

(54) SYSTEM AND METHOD FOR ENHANCED VEHICLE DATA CONNECTIVITY

(71) Applicant: GE Aviation Systems LLC, Grand Rapids, MI (US)

(72) Inventors: Steven Lane Misenheimer, Grand Rapids, MI (US); Christin L. Rauche, Cincinnati, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 288 days.

(21) Appl. No.: 17/008,994

(22) Filed: Sep. 1, 2020

(65) Prior Publication Data
US 2022/0063833 A1 Mar. 3, 2022

(51) Int. Cl.
*B64D 45/00* (2006.01)

(52) U.S. Cl.
CPC ...... *B64D 45/00* (2013.01); *B64D 2045/0075* (2013.01)

(58) Field of Classification Search
CPC ............ B64D 45/00; B64D 2045/0075; G08G 5/0052; G08G 5/0021
See application file for complete search history.

(56) References Cited

U.S. PATENT DOCUMENTS

| 8,918,271 | B2 | 12/2014 | Pendry et al. |
| 8,948,933 | B2 | 2/2015 | Pangilinan et al. |
| 9,037,317 | B2 | 5/2015 | Mead et al. |
| 9,047,013 | B2 | 6/2015 | Sae-Chim et al. |
| 9,440,748 | B1 | 9/2016 | Lentz et al. |
| 9,731,815 | B2 | 8/2017 | Pangilinan et al. |
| 10,311,740 | B2 | 6/2019 | Srivastav et al. |
| 10,460,610 | B2 | 10/2019 | Westervelt et al. |
| 10,535,272 | B2 | 1/2020 | Groden et al. |
| 2012/0079398 | A1 | 3/2012 | McGuffin et al. |
| 2017/0331895 | A1 | 11/2017 | Manjunath |
| 2018/0115609 | A1* | 4/2018 | Dusik ........................ G06F 8/70 |
| 2019/0065569 | A1* | 2/2019 | Boutros ................ G06F 16/212 |
| 2019/0311632 | A1 | 10/2019 | Hochwarth et al. |
| 2019/0311634 | A1 | 10/2019 | Lax et al. |
| 2021/0383706 | A1* | 12/2021 | Gibbons, II ......... G08G 5/0021 |

FOREIGN PATENT DOCUMENTS

WO 2013184155 A1 12/2013

OTHER PUBLICATIONS

Extended European Search Report for EP Application No. 21192481.6 dated Feb. 15, 2022 (9 pages).

* cited by examiner

*Primary Examiner* — Shon G Foley
(74) *Attorney, Agent, or Firm* — Dinsmore & Shohl LLP

(57) ABSTRACT

A method of operating an aircraft interface device may comprise receiving a request for a data dictionary from an electronic flight bag application and transmitting the data dictionary to the electronic flight bag application. The data dictionary may comprise a mapping between a plurality of parameters associated with an aircraft and a plurality of parameter identifiers. Values of the parameters may be retrieved by the aircraft interface device. The method may also include receiving a request for values of one or more of the parameters from the electronic flight bag, retrieving values of the parameters, and transmitting the values of the parameters to the electronic flight bag application.

13 Claims, 5 Drawing Sheets

SYSTEM AND METHOD FOR ENHANCED VEHICLE DATA CONNECTIVITY

FIELD

The present disclosure relates to communication with aircraft systems, and more specifically to a system and method for enhanced vehicle data connectivity.

BACKGROUND

An aircraft interface device (AID) is a hardware platform that allows a flight crew to access information relating to aircraft systems. This information may include position data from a flight Management system, flight information from an aircraft databus (e.g., altitude, airspeed, temperature, etc.), data from an aircraft communication addressing and reporting system, and other data related to the aircraft.

An electronic flight bag (EFB) is an electronic device that allows a flight crew to perform flight management tasks. An EFB may replace a traditional flight bag containing documents that a flight crew would historically take into a cockpit during a flight. An EFB may run EFB applications to display an aircraft operating manual, a flight crew operating manual, flight charts, navigation checklists, and the like. An EFB may also capture weather data, hazard alerts, incidents delays, route changes, or other real-time events during a flight.

An EFB may interface with an AID to capture operational data from the aircraft during a flight. This may allow the EFB to run EFB applications to generate moving maps and other features that rely on aircraft data. However, different aircraft models typically utilize different AIDs. As such, in order for an EFB to receive data from multiple AIDs, an EFB needs a different application for each such AID. Accordingly, there is a need for improved connectivity between EFBs and AIDs.

SUMMARY

In an embodiment, a method of operating an aircraft interface device may include receiving a request for a data dictionary from an electronic flight bag application and transmitting the data dictionary to the electronic flight bag application. The data dictionary may include a mapping between a plurality of parameters associated with an aircraft and a plurality of parameter identifiers. Values of the parameters may be retrieved by the aircraft interface device.

In an embodiment, a method of operating an electronic flight bag may include transmitting, from an electronic flight bag application, a request for a data dictionary to an aircraft interface device and receiving the data dictionary from the aircraft interface device. The data dictionary may include a mapping between a plurality of parameters associated with an aircraft and a plurality of parameter identifiers. Values of the parameters may be retrieved by the aircraft interface device.

In an embodiment, an aircraft interface device may include one or more processors, one or more memory modules, and machine readable instructions stored in the one or more memory modules. When executed by the one or more processors, the machine readable instructions may cause the aircraft interface device to receive, from an electronic flight bag application, a request for a data dictionary. The data dictionary may include a mapping between a plurality of parameters associated with an aircraft and a plurality of parameter identifiers. Values of the parameters may be retrieved by the aircraft interface device.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
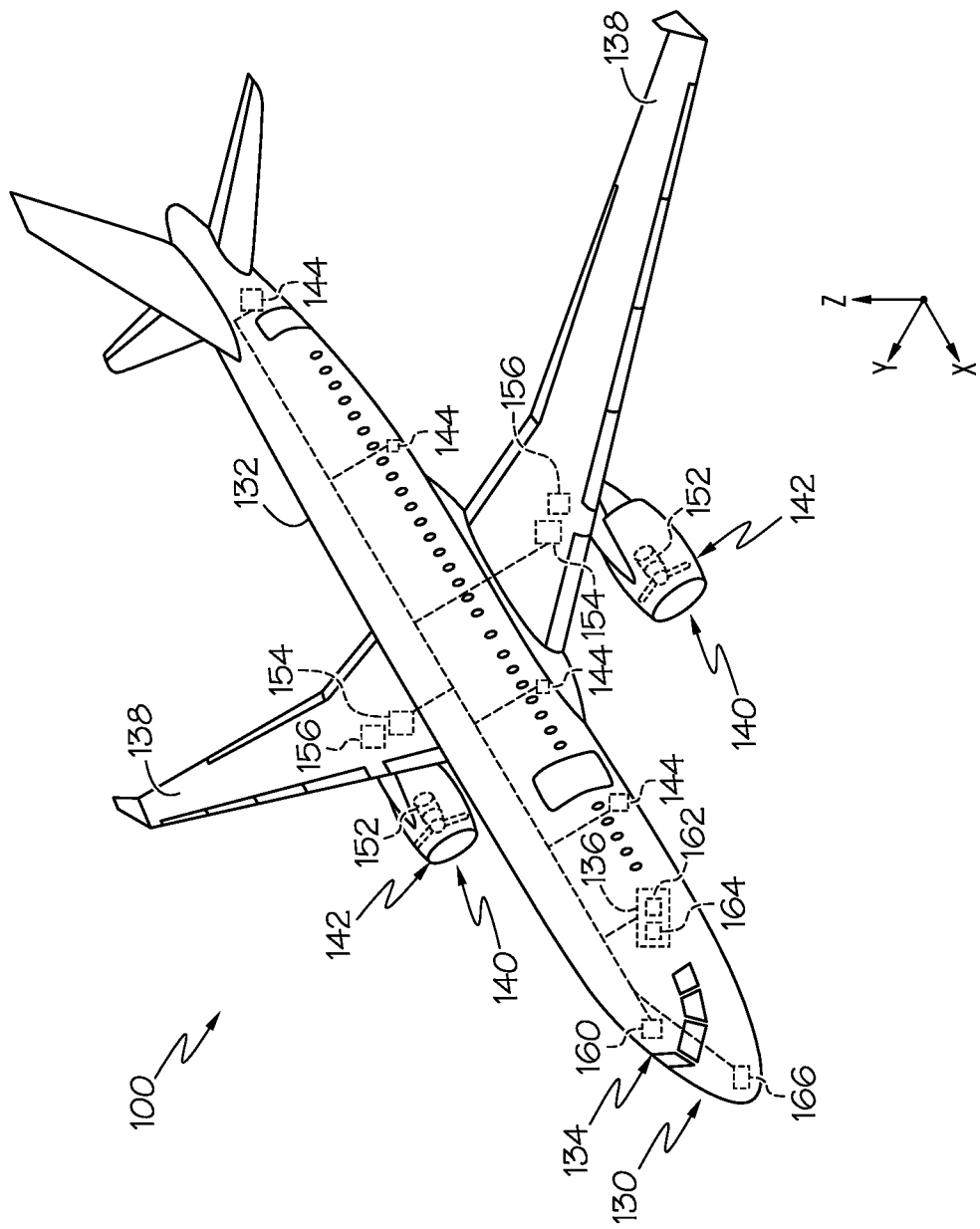
FIG. 1 schematically depicts an illustrative aircraft system according to one or more embodiments shown and described herein.

The present disclosure generally relates to devices, systems, and methods for enhanced vehicle data connectivity. As disclosed herein, an AID may communicate with and receive data from one or more aircraft systems of an aircraft during a flight. The data received by the AID may comprise parameters related to the one or more aircraft systems (e.g., altitude, airspeed, outside temperature, etc.). An EFB may communicate with and receive data from the AID related to the one or more aircraft systems. EFB applications may use the data received from the AID to present applications to a flight crew during a flight of the aircraft. For example, EFB applications may use position data and other parameters received from the AID to generate a moving map.

Currently, different models of aircraft may use different AIDs. These different AIDs may provide different parameters. In addition, when an EFB communicates with different AIDs, the EFB may be required to request the same parameter from different AIDs differently. For example, under one protocol (ARINC 834-4), all AIDs have a set of industry standard parameters that may be requested by name and/or number. As such, in order to access one of these industry standard parameters from any AID, an EFB need only transmit a request to an AID comprising the name or number of the desired parameter. All AIDs will then return the value of the parameter associated with the appropriate name or number for these industry standard parameters. However, beyond these industry standard parameters, the ARINC 834-4 standard allows for variability for different types of aircraft. That is, different AIDs are able to provide different parameter values and the parameter names and/or numbers used by different AIDs are not the same. For example, parameter 13 for one AID may not be the same as parameter 13 for another AID.

As such, when an EFB application requires a parameter from an AID beyond the industry standard parameters, it must use a different parameter name or number to request the parameter value depending on the particular AID involved. One potential solution to this problem is for an EFB to have a variety of applications that perform the same function for a variety of AIDs. For example, an EFB may have one moving map application for a first Boeing 737 model and another moving map application for a second Boeing 737 model. However, this requires an EFB to store many more applications than would otherwise be required. In addition, each separate application must be separately managed and some pilots are only rated for certain aircraft types. Thus, this is not an ideal solution.

In the present disclosure, an AID provides a data dictionary of parameters that are available. The data dictionary may map the available parameters to parameter names and/or numbers. An EFB may then access this data dictionary when communicating with the AID. EFB applications may include a software development kit that may allow EFB applications to access the parameters available from the AID. The EFB may then run a single application for all AIDs (e.g., a moving map application) and, whenever the application requires the value of a particular parameter, the EFB application may access the data dictionary to acquire the associated parameter name or number. The EFB application may then request the parameter from the AID by the appropriate parameter name or number.

Referring to FIG. 1, an illustrative aircraft system 100 is schematically depicted. In the illustrated embodiment of FIG. 1, the aircraft system 100 generally includes an aircraft 130, which may include a fuselage 132, wing assemblies 138, and one or more engines 140. While FIG. 1 depicts the aircraft 130 as being a fixed-wing craft having two wing assemblies 138 with one engine 140 mounted on each wing assembly 138 (two engines 140 total), other configurations are contemplated. For example, other configurations and/or aerial vehicles may include high speed compound rotary-wing aircraft with supplemental translational thrust systems, dual contra-rotating, coaxial rotor system aircraft, turbo-props, tilt-rotors, tilt-wing aircraft, conventional take-off and landing aircraft and other turbine driven machines will also benefit from the present disclosure. Furthermore, other configurations may include more than two wing assemblies 138, more than two engines 140 (e.g., trijets, quadjets, etc.), engines 140 that are not mounted to a wing assembly 138 (e.g., mounted to the fuselage 132, mounted to the tail, mounted to the nose, etc.), non-fixed wings (e.g., rotary wing aircraft), and/or the like.

Turning back to the illustrated aircraft system depicted in FIG. 1, as shown, a control mechanism 160 for controlling the aircraft 130 is included in the cockpit 134 and may be operated by a pilot located therein. It should be understood that the term "control mechanism" as used herein is a general term used to encompass all aircraft control components, particularly those typically found in the cockpit 134.

A plurality of additional aircraft systems 144 that enable proper operation of the aircraft 130 may also be included in the aircraft 130 as well as an engine control system 136, and a communication system having the aircraft wireless communications link 166. The additional aircraft systems 144 may generally be any systems that effect control of one or more components of the aircraft 130, such as, for example, cabin pressure controls, elevator controls, rudder controls, flap controls, spoiler controls, landing gear controls, heat exchanger controls, and/or the like. In some embodiments, the avionics of the aircraft 130 may be encompassed by one or more of the additional aircraft systems 144. The aircraft wireless communications link 166 may generally be any air-to-ground communication system now known or later developed. Illustrative examples of the aircraft wireless communications link 166 include, but are not limited to, a transponder, a very high frequency (VHF) communication system, an aircraft communications addressing and reporting system (ACARS), a controller-pilot data link communications (CPDLC) system, a future air navigation system (FANS), and/or the like. The engine control system 136 may be communicatively coupled to the plurality of aircraft systems 144 and the engines 140. In some embodiments, the engine control system 136 may be mounted on one or more of the engines 140 or mounted within the aircraft 130 and communicatively coupled to the engines 140. While the embodiment depicted in FIG. 1 specifically refers to the engine control system 136, it should be understood that other controllers may also be included within the aircraft 130 to control various other aircraft systems 144 that do not specifically relate to the engines 140.

The engine control system 136 generally includes one or more components for controlling each of the engines 140, such as, for example, a diagnostic computer, an engine-related digital electronic unit that is mounted on one or more of the engines 140 or the aircraft 130, and/or the like. The engine control system 136 may also be referred to as a digital engine control system. Illustrative other components within the engine control system that may function with the engine control system 136 and may require software to operate include, but are not limited to, an electronic control unit and other controller devices. The software implemented in any one of these components may be software that is distributed as described herein.

The engine control system 136 may also be connected with other controllers of the aircraft 130. In embodiments, the engine control system 136 may include a processor 162 and/or a non-transitory memory component 164, including non-transitory memory. In some embodiments, the non-transitory memory component 164 may include random access memory (RAM), read-only memory (ROM), flash memory, or one or more different types of portable electronic memory, such as discs, DVDs, CD-ROMs, or the like, or any suitable combination of these types of memory. The processor 162 may carry out one or more programming instructions stored on the non-transitory memory component 164, thereby causing operation of the engine control system 136. That is, the processor 162 and the non-transitory memory component 164 within the engine control system 136 may be operable to carry out the various processes described herein with respect to the engine control system 136, including operating various components of the aircraft 130 (such as the engine 140 and/or components thereof), monitoring the health of various components of the aircraft 130 (e.g., the engine 140 and/or components thereof), monitoring operation of the aircraft 130 and/or components thereof, installing software, installing software updates, modifying a record in a distributed ledger to indicate that software has been installed, and/or updated, carrying out processes according to installed and/or updated software, and/or the like.

In some embodiments, the engine control system 136 may include a full authority digital engine control (FADEC) system. Such a FADEC system can include various electronic components, one or more sensors, and/or one or more actuators that control each of the engines 140. In particular embodiments, the FADEC system includes an ECU, as well as one or more additional components that are configured to control various aspects of performance of the engines 140. The FADEC system generally has full authority over operating parameters of the engines 140 and cannot be manually overridden. A FADEC system generally functions by receiving a plurality of input variables of a current flight condition, including, but not limited to, air density, throttle lever position, engine temperature, engine pressure, and/or the like. The inputs are received, analyzed, and used to determine operating parameters such as, but not limited to, fuel flow, stator vane position, bleed valve position, and/or the like. The FADEC system may also control a start or a restart of the engines 140. The operating parameters of the FADEC can be modified by installing and/or updating software, such as the software that is distributed by the aircraft system 100 described herein. As such, the FADEC can be programmatically controlled to determine engine limitations, receive engine health reports, receive engine maintenance reports and/or the like to undertake certain measures and/or actions in certain conditions.

The software run by the engine control system 136 (e.g., executed by the processor 162 and stored within the non-transitory memory component 164) may include a computer program product that includes machine-readable media for carrying or having machine-executable instructions or data structures. Such machine-readable media may be any available media, which can be accessed by a general purpose or special purpose computer or other machine with a processor. Generally, such a computer program may include routines, programs, objects, components, data structures, algorithms, and/or the like that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions. In some embodiments, the computer program product may be provided by a component external to the engine control system 136 and installed for use by the engine control system 136. The computer program product may generally be updatable via a software update that is received from one or more components of the aircraft system 100. The software is generally updated by the engine control system 136 by installing the update such that the update supplements and/or overwrites one or more portions of the existing program code for the computer program product. The software update may allow the computer program product to more accurately diagnose and/or predict faults, provide additional functionality not originally offered, and/or the like.

In embodiments, each of the engines 140 may include a fan 142 and one or more sensors for sensing various characteristics of the fan 142 during operation of the engines 140. Illustrative examples of the one or more sensors include, but are not limited to, a fan speed sensor 152, a temperature sensor 154, and a pressure sensor 156. The fan speed sensor 152 is generally a sensor that measures a rotational speed of the fan 142 within the engine 140. The temperature sensor 154 may be a sensor that measures a fluid temperature within the engine 140 (e.g., an engine air temperature), a temperature of fluid (e.g., air) at an engine intake location, a temperature of fluid (e.g., air) within a compressor, a temperature of fluid (e.g., air) within a turbine, a temperature of fluid (e.g., air) within a combustion chamber, a temperature of fluid (e.g., air) at an engine exhaust location, a temperature of cooling fluids and/or heating fluids used in heat exchangers in or around an engine, and/or the like. The pressure sensor 156 may be a sensor that measures a fluid pressure (e.g., air pressure) in various locations in and/or around the engine 140, such as, for example, a fluid pressure (e.g., air pressure) at an engine intake, a fluid pressure (e.g., air pressure) within a compressor, a fluid pressure (e.g., air pressure) within a turbine, a fluid pressure (e.g., air pressure) within a combustion chamber, a fluid pressure (e.g., air pressure) at an engine exhaust location, and/or the like.

In some embodiments, each of the engines 140 may have a plurality of sensors associated therewith (including one or more fan speed sensors 152, one or more temperature sensors 154, and/or one or more pressure sensors 156). That is, more than one of the same type of sensor may be used to sense characteristics of an engine 140 (e.g., a sensor for each of the different areas of the same engine 140). In some embodiments, one or more of the sensors may be utilized to sense characteristics of more than one of the engines 140 (e.g., a single sensor may be used to sense characteristics of two engines 140). The engines 140 may further include additional components not specifically described herein, and may include one or more additional sensors incorporated with or configured to sense such additional components in some embodiments.

In embodiments, each of the sensors (including, but not limited to, the fan speed sensors 152, the temperature sensors 154, and the pressure sensors 156) may be communicatively coupled to one or more components of the aircraft 130 such that signals and/or data pertaining to one or more sensed characteristics are transmitted from the sensors for the purposes of determining, detecting, and/or predicting a fault, as well as completing one or more other actions in accordance with software that requires sensor information. As indicated by the dashed lines extending between the various sensors (e.g., the fan speed sensors 152, the temperature sensors 154, and the pressure sensors 156) and the aircraft systems 144 and the engine control system 136 in the embodiment depicted in FIG. 1, the various sensors may be communicatively coupled to the aircraft systems 144 and/or the engine control system 136 in some embodiments. As such, the various sensors may be communicatively coupled via wires or wirelessly to the aircraft systems 144 and/or the engine control system 136 to transmit signals and/or data to the aircraft systems 144 and/or the engine control system 136 via an aircraft bus.

An aircraft bus may enable an aircraft and/or one or more components of the aircraft to interface with one or more external system through wireless or wired means. An aircraft bus as used herein may be formed from any medium that is configured to transmit a signal. As non-limiting examples, the aircraft bus is formed of conductive wires, conductive traces, optical waveguides, or the like. The aircraft bus may also refer to the expanse in which electromagnetic radiation and their corresponding electromagnetic waves are propagated. Moreover, the aircraft bus may be formed from a combination of mediums configured to transmit signals. In one embodiment, the aircraft bus includes a combination of conductive traces, conductive wires, connectors, and buses that cooperate to permit the transmission of electrical data signals to and from the various components of the engine control system 136. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

While the embodiment of FIG. 1 specifically relates to components within an aircraft 130, the present disclosure is not limited to such. That is, the various components depicted with respect to the aircraft 130 may be incorporated within various other types of craft and may function in a similar manner to deliver and install new software and/or updated software to the engine control system 136 as described herein. For example, the various components described herein with respect to the aircraft 130 may be present in watercraft, spacecraft, and/or the like without departing from the scope of the present disclosure.

Furthermore, it should be appreciated that, although a particular aerial vehicle has been illustrated and described, other configurations and/or aerial vehicles, such as high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure.

Figure 2:
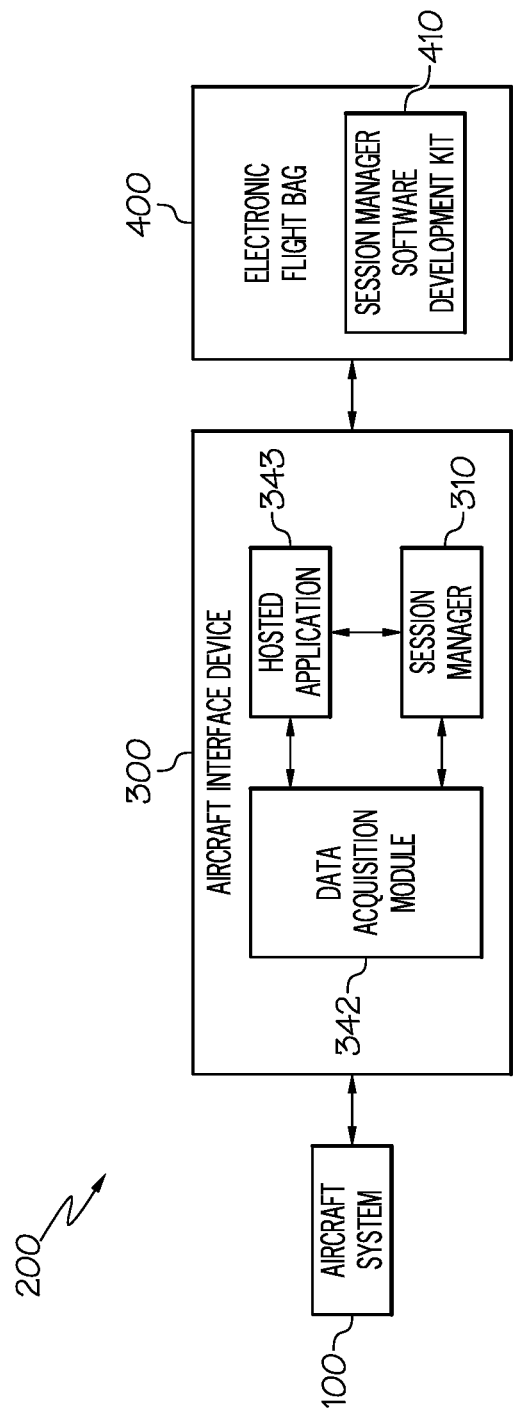
FIG. 2 schematically depicts a functional block diagram of an enhanced data connectivity system according to one or more embodiments shown and described herein.

Turning now to FIG. 2, an illustrative embodiment of an enhanced data connectivity system 200 is shown. The enhanced data connectivity system 200 comprises the aircraft system 100, an AID 300 and an EFB 400. As shown in FIG. 2, the AID 300 comprises a session manager 310, a data acquisition module 342, and a hosted application 343. In embodiments, the data acquisition module 342 may communicate with the aircraft system 100 (e.g., with electronic components in the cockpit 134) and receive data related to one or more aircraft systems 144 of the aircraft 130. The hosted application 343 may generate derived results from the data received by the data acquisition module 342 from the aircraft system 200. The hosted application 343 may make the derived results available to the session manager 310. The session manager 310 may facilitate communication between the AID 300 and the EFB 400. The AID 300 is discussed in further detail below with respect to FIG. 3.

In embodiments, the EFB 400 may communicate with the AID 300. As shown in FIG. 2, the EFB 400 comprises a session manager software development kit 410 (SMS SDK). In the illustrated example, the SMS SDK 410 may reside on each application on the EFB 400. The EFB 400 may transmit requests to the AID 300 for aircraft data and the AID 300 may transmit aircraft data to the EFB 400 in response to such requests. The EFB 400 may use the aircraft data received from the AID 300 to run various applications. The SMS SDK 410 may provide a secure connective channel with the AID 300 and may allow EFB applications to access the data received from the AID 300. The EFB 400 is discussed in further detail below with respect to FIG. 4.

Figure 3:
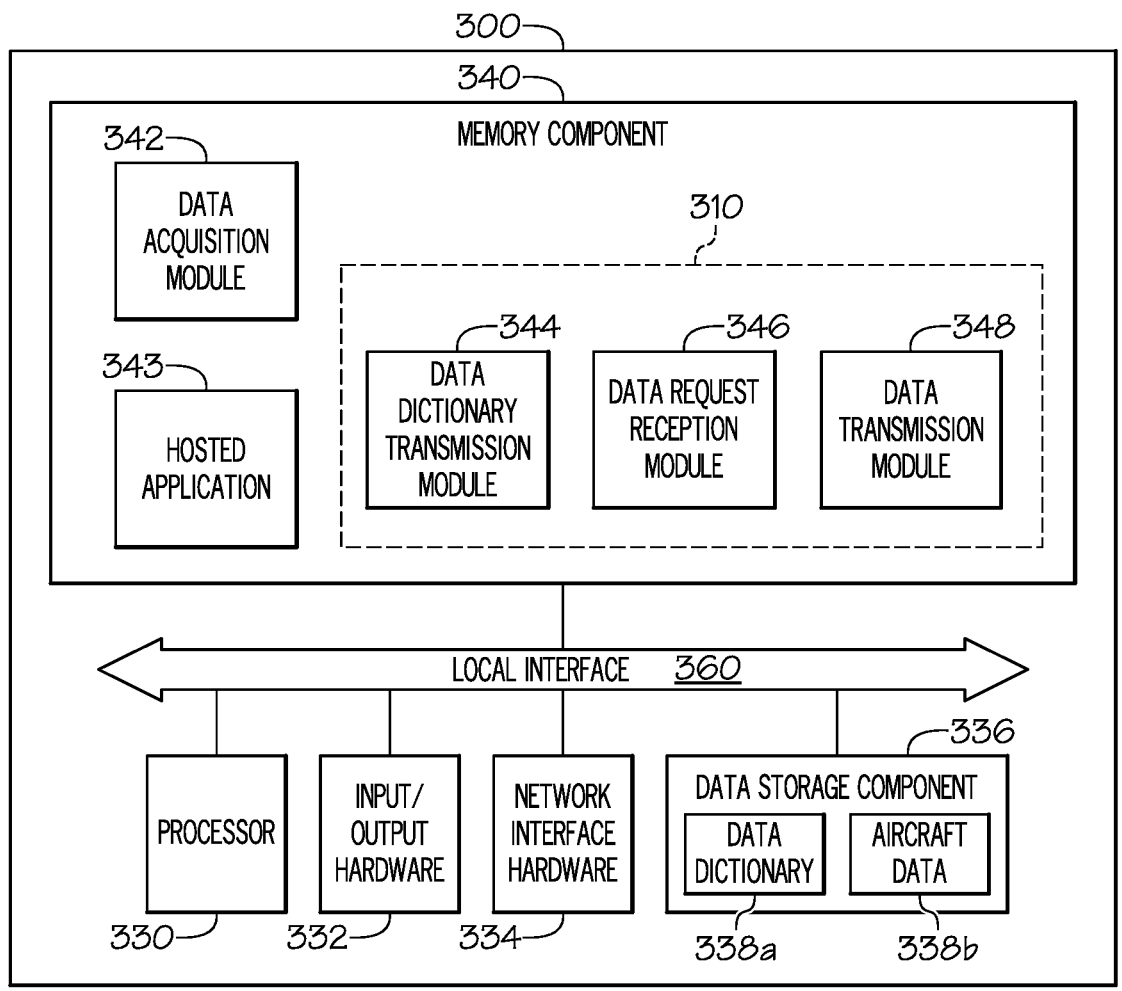
FIG. 3 schematically depicts a functional block diagram of an aircraft interface device according to one or more embodiments shown and described herein.

Turning now to FIG. 3, an illustrative system diagram of the AID 300 is depicted. The AID 300 may include a processor 330, input/output hardware 332, network interface hardware 334, a data storage component 336, and a memory component 340.

The processor 330 may include any processing component(s) configured to receive and execute instructions (such as from the data storage component 336 and/or the memory component 340). The instructions may be in the form of a machine-readable instruction set stored in the data storage component 336 and/or the memory component 340. The input/output hardware 332 may include a display, keyboard, mouse, printer, camera, microphone, speaker, and/or other device for receiving, sending, and/or presenting data. In some examples, the input/output hardware 332 may be used to display values of parameters associated with the aircraft 130.

The network interface hardware 334 may include any wired or wireless networking hardware, such as a modem, LAN port, Wi-Fi card, WiMax card, mobile communications hardware, and/or other hardware for communicating with other networks and/or devices. For example, the network interface hardware 334 may include a transceiver. The network interface hardware 334 may allow for communication between the AID 300 and the aircraft system 100 and/or the EFB 400. In some examples, the AID 300 may connect directly to the aircraft system 100 and/or the EFB 400 (e.g., through a wired connection).

The memory component 340 may be machine-readable memory (which may also be referred to as a non-transitory processor readable memory). The memory component 340 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 340 may be configured to store a data acquisition module 342, a hosted application 343, a data dictionary transmission module 344, a data request reception module 346, a data transmission module 348, and/or other modules that may be necessary for enabling operation of the AID 300 (each of which may be embodied as a computer program, firmware, or hardware, as an example).

A local interface 360 is also included in FIG. 3 and may be implemented as a bus or other interface to facilitate communication among the components of the AID 300.

The data storage component 336 may reside local to and/or remote from the AID 300 and may be configured to store one or more pieces of data for access by the AID 300 and/or other components. As illustrated in FIG. 3, the data storage component 336 may store a data dictionary 338*a*, aircraft data 338*b*, and/or other data sets, as disclosed in further detail below.

The data dictionary 338*a* may comprise a plurality of parameters associated with the aircraft 130. These parameters may comprise values associated with various aircraft systems 144 of the aircraft 130 that may be measured (e.g., voltages, temperatures, elevation, air speed, and the like). As explained above, the AID 300 may retrieve values of parameters from the aircraft system 100 during a flight. Because different aircraft models comprise different aircraft systems, the AID 300 may only work with a particular aircraft model. Further, different aircraft interface devices are able to retrieve different parameter values. In addition, the parameters that an aircraft interface device is able to retrieve from an aircraft may change over time through the addition of new equipment or embedded functionality to the aircraft. Thus, the data dictionary 338*a* may provide a listing of all of the parameters that the AID 300 may retrieve from the aircraft 130. The EFB 400 may retrieve the data dictionary 338*a*, as explained in further detail below, in order to learn the parameter values that the AID 300 may retrieve from the aircraft 130.

The data dictionary 338*a* may further comprise a parameter identifier associated with each of the plurality of parameters associated with the aircraft 130 that may be retrieved by the AID 300. The data dictionary 338*a* may provide a mapping between the parameters of the aircraft 130 that may be retrieved by the AID 300 and the parameter identifiers. The parameter identifier allows a parameter value to be requested from the AID by specifying the appropriate parameter identifier. In the illustrated example, a parameter identifier is a parameter number. In some examples, a parameter identifier may be a parameter name. In other examples, a parameter identifier may comprise another type of identification to specify a particular parameter.

As explained in further detail below, the EFB 400 may retrieve a parameter value from the AID 300 by transmitting a request to the AID 300 for a particular parameter. However, as explained above, different aircraft interface devices may use different parameter names or numbers to refer to the same parameter. As such, if the EFB 400 requests a parameter from the AID 300 using the wrong parameter name or number, the EFB 400 may retrieve the wrong parameter value, which may prevent one or more applications on the EFB 400 from running properly. Thus, the data dictionary 338*a* includes a parameter identifier associated with each available parameter. Accordingly, after the EFB 400 retrieves the data dictionary 338*a* from the AID 300, the EFB 400 may access the data dictionary 338*a* in order to request parameter values by the appropriate parameter identifier.

The aircraft data 338*b* may comprise data associated with the aircraft 130. The aircraft data 338*b* may include measured values of the parameters included in the data dictionary 338*a*. By storing certain parameter values in the data storage component 336, these parameter values may be easily accessible at a later time. In some examples, aircraft data may not be stored in the data storage component 336.

Referring still to FIG. 3, the memory component 340 may include a data acquisition module 342, a hosted application 343, a data dictionary transmission module 344, a data request reception module 346, and a data transmission module 348. The data acquisition module 342 may acquire data associated with one or more aircraft systems 144 of the aircraft 130. Specifically, the data acquisition module 342 may acquire values of one or more parameters associated with the aircraft 130. After data is acquired by the data acquisition module 342, it may be stored in the data storage component 336 as aircraft data 338*b*.

In some examples, the hosted application 343 may generate new derived results from the data received by the data acquisition module 342 from the aircraft 130. That is, the data acquisition module 342 may receive raw data from one or more aircraft systems 144 of the aircraft 130 and the hosted application 343 may derive certain parameters or other data associated with the aircraft 130 based on the raw data received by the data acquisition module 342.

The data dictionary transmission module 344 may transmit the data dictionary 338*a* to the EFB 400 after receiving a request from the EFB 400. This allows the EFB 400 to have access to the parameter values that may be retrieved by the data acquisition module 342 as well as the parameter identifiers associated with each of the parameters.

The data request reception module 346 may receive a request from the EFB 400 for one or more parameter values. The request for a parameter value may include a parameter identifier associated with the desired parameter based on the data dictionary 338*a*. After the data request reception module 346 receives a request for one or more parameter values, the data acquisition module 342 may retrieve the one or more parameter values from the aircraft 130.

The data transmission module 348 may transmit one or more parameter values to the EFB 400 after the data acquisition module 342 acquires the one or more parameter values from the aircraft 130. The data dictionary transmission module 344, the data request reception module 346, and the data transmission module 348 together may comprise the session manager 310, which may facilitate communication between the AID 300 and the EFB 400.

Figure 4:
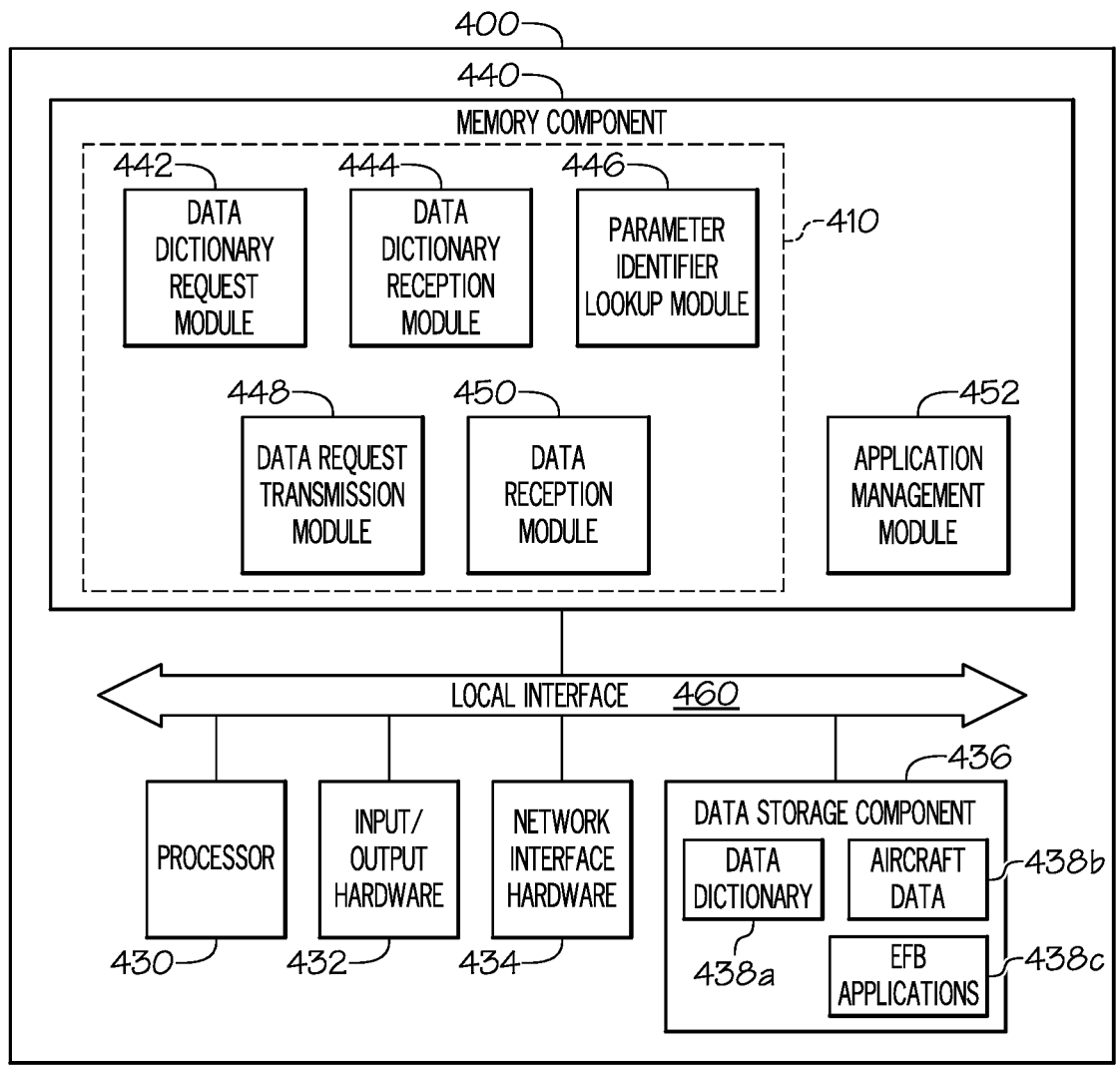
FIG. 4 schematically depicts a functional block diagram of an electronic flight bag according to one or more embodiments shown and described herein

Turning now to FIG. 4, an illustrative system diagram of the EFB 400 is depicted. The EFB 400 may include a processor 430, input/output hardware 432, network interface hardware 434, a data storage component 436, and a memory component 440.

The processor 430 may include any processing component(s) configured to receive and execute instructions (such as from the data storage component 436 and/or the memory component 440). The instructions may be in the form of a machine-readable instruction set stored in the data storage component 436 and/or the memory component 440. The input/output hardware 432 may include a display, keyboard, mouse, printer, camera, microphone, speaker, and/or other device for receiving, sending, and/or presenting data. In some examples, the input/output hardware 432 may be used to receive input and or display output from a user (e.g., flight crew of the aircraft 130).

The network interface hardware 434 may include any wired or wireless networking hardware, such as a modem, LAN port, Wi-Fi card, WiMax card, mobile communications hardware, and/or other hardware for communicating with other networks and/or devices. For example, the network interface hardware 434 may include a transceiver. The network interface hardware 434 may allow for communication between the EFB 400 and the AID 300. In some examples, the EFB 400 may be connected directly to the AID 300 (e.g., through a wired connection).

The memory component 440 may be machine-readable memory (which may also be referred to as a non-transitory processor readable memory). The memory component 440 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 440 may be configured to store a data dictionary request module 442, a data dictionary reception module 444, a parameter identifier lookup module 446, a data request transmission module 448, a data reception module 450, an application management module 452, and/or other modules that may be necessary for enabling operation of the AID 300 (each of which may be embodied as a computer program, firmware, or hardware, as an example).

A local interface 460 is also included in FIG. 4 and may be implemented as a bus or other interface to facilitate communication among the components of the EFB 400.

The data storage component 436 may reside local to and/or remote from the EFB 400 and may be configured to store one or more pieces of data for access by the EFB 400 and/or other components. As illustrated in FIG. 4, the data storage component 436 may store a data dictionary 438a, aircraft data 438b, EFB applications 438c, and/or other data sets, as disclosed in further detail below.

The data dictionary 438a may comprise a data dictionary received from the AID 300. Specifically, the data dictionary 438a may comprise a mapping between a plurality of parameters associated with the aircraft 130 that may be accessed by the AID 300 and parameter identifiers associated with those parameters. More specifically, the data dictionary 438a may specify a parameter identifier associated with each available parameter associated with the aircraft 130. As such, values of the parameters may be retrieved from the AID 300 by specifying the appropriate parameter identifiers associated with the parameters.

The aircraft data 438b may comprise data associated with the aircraft 130 received from the AID 300. Specifically, the aircraft data 438b may include measured parameters values received from the AID 300. The aircraft data 438b may be used by the EFB applications 438c.

The EFB applications 438c comprise one or more applications that may be run by the EFB 400. For example, one application that EFB 400 may run is a moving map application. The EFB applications 438c may utilize aircraft data 438b to operate.

Referring still to FIG. 4, the memory component 440 may include a data dictionary request module 442, a data dictionary reception module 444, a data request transmission module 448, a data reception module 450, and an application management module 452.

The data dictionary request module 442 may request a data dictionary from the AID 300 comprising parameters that the AID 300 may retrieve from the aircraft 130 and their associated parameter identifiers. The data dictionary reception module 444 may receive the requested data dictionary from the AID 300. The data dictionary reception module 444 may store the received data dictionary in the data storage component 436 as the data dictionary 438a.

The parameter identifier lookup module 446 may look up a parameter identifier associated with a desired parameter. In embodiments, an application running on the EFB 400 (e.g., a moving map application) may require a value of a particular parameter for operation (e.g., elevation, airspeed, etc.). However, as discussed above, the parameters of the AID 300 may be accessed by parameter identifier. As such, the parameter identifier lookup module 446 accesses the data dictionary 438a that was received from the AID 300 and determine the parameter identifier associated with the desired parameter. The parameter identifier lookup module 446 may then pass then determined parameter identifier to the data request transmission module 448, which may use the parameter identifier to formulate a request for the desired parameter, as discussed below.

The data request transmission module 448 may request data from the AID 300. Specifically, the data request transmission module 448 may request values of one or more parameters from the AID 300. The data request transmission module 448 may utilize the appropriate parameter identifier determined by the parameter identifier lookup module 446 to formulate a request for one or more parameters. The data request transmission module 448 may thus transmit a request to the AID 300 for the value of the parameter associated with that parameter identifier.

The data reception module 450 may receive values of one or more parameters requested by the data request transmission module 448 from the AID 300. The data reception module 450 may then store the received parameter values in the data storage component 436 as aircraft data 438b. The data dictionary request module 442, the data dictionary reception module 444, the parameter identifier lookup module 446, the data request transmission module 448, and the data reception module 450 together may comprise the SMS SDK 410, which may facilitate communication between the EFB 400 and the AID 300. The SMS SDK 410 may provide standard methods to applications that run on the EFB 400 such that the applications may learn what data is available from the AID 300 and the applications may then request one or more parameters from the AID 300 to be used by the applications. In one example, this may be managed by the application management module 452, discussed below.

The application management module 452 may manage applications on the EFB 400. In embodiments, the application management module 452 may cause one or more of the EFB applications 438c to run and may manage the operation of the one or more applications. When an application running on the EFB 400 needs a parameter value from the aircraft 130, the application management module 452 may cause the parameter identifier lookup module 446 to lookup the appropriate parameter identifier for the parameter and may cause the data request transmission module 448 to request the appropriate parameter value as discussed above.

Figure 5:
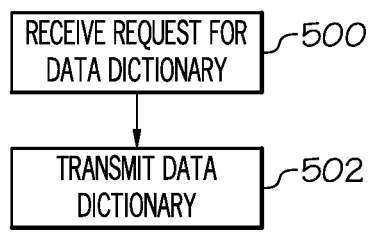
FIG. 5 depicts a flow diagram of an illustrative method of performing enhanced vehicle data connectivity that may be performed by an aircraft interface device

Turning now to FIG. 5, an illustrative flow diagram depicting a method of performing enhanced data connectivity is shown. The method of FIG. 5 may be performed by the AID 300.

At step 500, the AID 300 receives a request for a data dictionary from an EFB application on the EFB 400. As discussed above, a data dictionary may comprise a mapping between plurality of parameters associated with the aircraft 130 and a plurality of parameter identifiers, wherein the values of the parameters may be retrieved by the AID 300. In some examples, the plurality of parameter identifiers may comprise a parameter number associated with each of the plurality of parameters associated with the aircraft. In other examples, the plurality of parameter identifiers may comprise a parameter name associated with each of the plurality of parameters associated with the aircraft. The plurality of parameters associated with the aircraft may depend on a model of the aircraft.

At step 502, the data dictionary transmission module 344 transmits the data dictionary 338a to the EFB application on the EFB 400.

Figure 6:
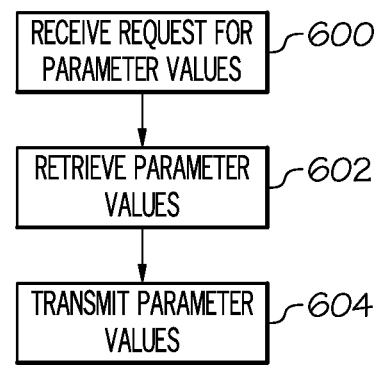
FIG. 6 depicts a flow diagram of another illustrative method of performing enhanced vehicle data connectivity that may be performed by an aircraft interface device

Turning now to FIG. 6, an illustrative flow diagram depicting another method of performing enhanced data connectivity is shown. The method of FIG. 6 may be performed by the AID 300 after the AID transmits the data dictionary 338a to the EFB 400, as discussed above with reference to FIG. 5.

At step 600, the data request reception module 346 receives a request from an EFB application on the EFB 400 for values of one or more of the plurality of parameters associated with the aircraft 130. The plurality of parameters may comprise the parameters identified in the data dictionary 338a. The request may comprise the parameter identifiers associated with the one or more of the plurality of parameters.

At step 602, the data acquisition module 342 retrieves the values of one or more of the plurality of parameters from the aircraft 130. The values of the one or more of the plurality of parameters associated with the aircraft 130 may comprise measured values associated with the aircraft 130 during a flight.

At step 604, the data transmission module 348 transmits the values of the one or more of the plurality of parameters retrieved by the data acquisition module 342 to the EFB application on the EFB 400.

Figure 7:
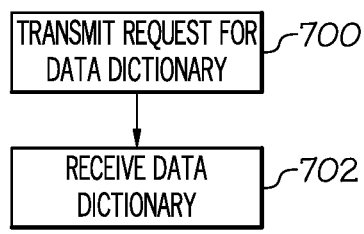
FIG. 7 depicts a flow diagram of an illustrative method of performing enhanced vehicle data connectivity that may be performed by an electronic flight bag.

Turning now to FIG. 7, an illustrative flow diagram depicting another method of performing enhanced data connectivity is shown. The method of FIG. 7 may be performed by the EFB 400.

At step 700, the data dictionary request module 442 transmits a request for a data dictionary from the AID 300. At step 702, the data dictionary reception module 444 receives the data dictionary 338a from the AID 300. The EFB 400 may store the received data dictionary in the data storage component 436.

Figure 8:
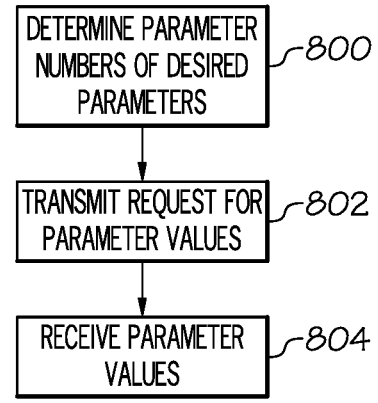
FIG. 8 depicts a flow diagram of another illustrative method of performing enhanced vehicle data connectivity that may be performed by an electronic flight bag.

Turning now to FIG. 8, an illustrative flow diagram depicting another method of performing enhanced data connectivity is shown. The method of FIG. 8 may be performed by the EFB 400 after the EFB 400 receives the data dictionary 338a from the AID 300, as discussed above with reference to FIG. 7.

At step 800, the parameter identifier lookup module 446 determines parameter identifiers associated with one or more of the plurality of parameters associated with the aircraft 130 to the AID 300. The parameter identifier lookup module 446 may determine the parameter identifiers by accessing the data dictionary 438a in the data storage component 436.

At step 802, the data request transmission module 448 transmits a request for values of the one or more of the plurality of parameters associated with the aircraft 130 to the AID 300. The request may comprise the parameter identifiers associated with the one or more of the plurality of parameters.

At step 804, the data reception module 450 receives the values of the one or more of the plurality of parameters associated with the aircraft 130 from the AID 300. The data reception module 450 may store the received values in the data storage component 436. The application management module 452 may then use the received values of the one or more of the plurality of parameters to operate an electronic flight bag application.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that that the devices, systems, and methods described herein allow for enhanced vehicle data connectivity between an electronic flight bag, an aircraft interface device, and an aircraft. The devices, systems, and methods described herein allow for a data dictionary to be transmitted from an AID to an EFB. The data dictionary may comprise a mapping between the parameters of the aircraft that may be retrieved by the AID and parameter identifiers associated with those parameters. The parameter identifiers may comprise parameter numbers of parameter names. The EFB may then utilize the parameter identifiers from the data dictionary to request values of specific parameters from the AID. The AID may then retrieve the requested parameter values and transmit the parameter values to the EFB. The EFB may then use the received data in the operation of one or more applications.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A method of operating an aircraft interface device comprising receiving, from an electronic flight bag application, a request for a data dictionary, wherein the data dictionary comprises a mapping between a plurality of parameters associated with an aircraft and a plurality of parameter identifiers, and wherein values of the parameters may be retrieved by the aircraft interface device; and transmitting the data dictionary to the electronic flight bag application.

The method of any preceding clause, wherein the plurality of parameter identifiers comprise a parameter number associated with each of the plurality of parameters associated with the aircraft.

The method of any preceding clause, wherein the plurality of parameter identifiers comprise a parameter name associated with each of the plurality of parameters associated with the aircraft.

The method of any preceding clause, wherein the plurality of parameters associated with the aircraft depend on a model of the aircraft.

The method of any preceding clause, further comprising receiving, from the electronic flight bag application, a request for values of one or more of the plurality of parameters associated with the aircraft; retrieving values of the one or more of the plurality of parameters; and transmitting the values of the one or more of the plurality of parameters to the electronic flight bag application.

The method of any preceding clause, wherein the request for the values of the one or more of the plurality of parameters comprises the parameter identifiers associated with the one or more of the plurality of parameters.

The method of any preceding clause, wherein the values of the one or more of the plurality of parameters associated with the aircraft comprise measured values associated with the aircraft during a flight.

A method of operating an electronic flight bag comprising transmitting, from an electronic flight bag application, a request for a data dictionary to an aircraft interface device, wherein the data dictionary comprises a mapping between a plurality of parameters associated with an aircraft and a plurality of parameter identifiers, and wherein values of the parameters may be retrieved by the aircraft interface device; and receiving the data dictionary.

The method of any preceding clause, wherein the plurality of parameter identifiers comprise a parameter number associated with each of the plurality of parameters associated with the aircraft.

The method of any preceding clause, wherein the plurality of parameter identifiers comprise a parameter name associated with each of the plurality of parameters associated with the aircraft.

The method of any preceding clause, wherein the plurality of parameters associated with the aircraft depend on a model of the aircraft.

The method of any preceding clause, further comprising transmitting, from the electronic flight bag application, a request for values of one or more of the plurality of parameters associated with the aircraft to the aircraft interface device; and receiving the values of the one or more of the plurality of parameters associated with the aircraft from the aircraft interface device.

The method of any preceding clause, further comprising determining parameter identifiers associated with the one or more of the plurality of parameters based on the data dictionary; and transmitting the parameter identifiers associated with the one or more of the plurality of parameters to the aircraft interface device.

The method of any preceding clause, further comprising utilizing the received values of the one or more of the plurality of parameters to operate the electronic flight bag application.

An aircraft interface device comprising one or more processors; one or more memory modules; and machine readable instructions stored in the one or more memory modules that, when executed by the one or more processors, cause the aircraft interface device to receive, from an electronic flight bag application, a request for a data dictionary, wherein the data dictionary comprises a mapping between a plurality of parameters associated with an aircraft and a plurality of parameter identifiers, and wherein values of the parameters may be retrieved by the aircraft interface device; and transmit the data dictionary to the electronic flight bag application.

The aircraft interface device of any preceding clause, wherein the plurality of parameter identifiers comprise a parameter number associated with each of the plurality of parameters associated with the aircraft.

The aircraft interface device of any preceding clause, wherein the plurality of parameter identifiers comprise a parameter name associated with each of the plurality of parameters associated with the aircraft.

The aircraft interface device of any preceding clause, wherein the machine readable instructions, when executed by the one or more processors, cause the aircraft interface device to receive, from the electronic flight bag application, a request for the values of one or more of the plurality of parameters associated with the aircraft; retrieve values of the one or more plurality of parameters; and transmit the values of the one or more of the plurality of parameters to the electronic flight bag application.

The aircraft interface device of any preceding clause, wherein the request for the values of the one or more of the plurality of parameters comprises parameter identifiers associated with the one or more of the plurality of parameters.

The aircraft interface device of any preceding clause, wherein the values of the one or more of the plurality of parameters associated with the aircraft comprise measured values associated with the aircraft during a flight.

What is claimed is:

1. A method of operating an aircraft interface device comprising:
    receiving, from an electronic flight bag application, a request for a data dictionary, wherein the data dictionary comprises a mapping between each of a plurality of parameters associated with an aircraft and a respective parameter identifier associated with each parameter, and wherein a value of a parameter may be retrieved by the aircraft interface device by specifying the respective parameter identifier associated with the parameter;
    transmitting the data dictionary to the electronic flight bag application;
    receiving, from the electronic flight bag application, a request for a value of a first parameter associated with the aircraft, the request including a first parameter identifier associated with the first parameter;
    retrieving the value of the first parameter; and
    transmitting the value of the first parameter to the electronic flight bag application.

2. The method of claim 1, wherein the respective parameter identifier associated with each parameter comprises a parameter number associated with each of the plurality of parameters associated with the aircraft.

3. The method of claim 1, wherein the respective parameter identifier associated with each parameter comprises a parameter name associated with each of the plurality of parameters associated with the aircraft.

4. The method of claim 1, wherein the plurality of parameters associated with the aircraft depend on a model of the aircraft.

5. The method of claim 1, wherein the value of the first parameter comprises a measured value associated with the aircraft during a flight.

6. A method of operating an electronic flight bag, comprising:
    transmitting, from an electronic flight bag application, a request for a data dictionary to an aircraft interface device, wherein the data dictionary comprises a mapping between each of a plurality of parameters associated with an aircraft and a respective parameter identifier associated with each parameter, and wherein a value of a parameter may be retrieved by the aircraft interface device by specifying the respective parameter identifier associated with the parameter;
    receiving the data dictionary from the aircraft interface device;
    determining a first parameter identifier associated with a first parameter associated with the aircraft based on the data dictionary;
    transmitting, from the electronic flight bag application, a request for a value of the first parameter associated with the aircraft to the aircraft interface device, the request including the first parameter identifier;
    receiving the value of the first parameter from the aircraft interface device; and
    utilizing the received values of the one or more of the plurality of parameters to operate the electronic flight bag application.

7. The method of claim 6, wherein the respective parameter identifier associated with each parameter comprises a parameter number associated with each of the plurality of parameters associated with the aircraft.

8. The method of claim 6, wherein the respective parameter identifier associated with each parameter comprises a parameter name associated with each of the plurality of parameters associated with the aircraft.

9. The method of claim 6, wherein the plurality of parameters associated with the aircraft depend on a model of the aircraft.

10. An aircraft interface device comprising:
    one or more processors;
    one or more memory modules; and machine readable instructions stored in the one or more memory modules that, when executed by the one or more processors, cause the aircraft interface device to:

receive, from an electronic flight bag application, a request for a data dictionary, wherein the data dictionary comprises a mapping between each of a plurality of parameters associated with an aircraft and a respective parameter identifier associated with each parameter, and wherein a value of a parameter may be retrieved by the aircraft interface device by specifying the respective parameter identifier associated with the parameter;

transmit the data dictionary to the electronic flight bag application;

receive, from the electronic flight bag application, a request for a value of a first parameter associated with the aircraft, the request including a first parameter identifier associated with the first parameter;

retrieving the value of the first parameter; and transmitting the value of the first parameter to the electronic flight bag application.

11. The aircraft interface device of claim 10, wherein the respective parameter identifier associated with each parameter comprises a parameter number associated with each of the plurality of parameters associated with the aircraft.

12. The aircraft interface device of claim 10, wherein the respective parameter identifier associated with each parameter comprises a parameter name associated with each of the plurality of parameters associated with the aircraft.

13. The aircraft interface device of claim 10, wherein the value of the first parameter comprises a measured value associated with the aircraft during a flight.

\* \* \* \* \*